United States Patent
Xu et al.

(10) Patent No.: US 9,315,160 B2
(45) Date of Patent: Apr. 19, 2016

(54) SECURING A JACK AND A SPARE WHEEL TO A VEHICLE

(71) Applicant: FORD GLOBAL TECHNOLOGIES, LLC, Dearborn, MI (US)

(72) Inventors: Naijiang Xu, Nanjing (CN); Zhenhong Ge, Nanjing (CN); Jihong Zhang, Nanjing (CN); Jonathan William Vaillancourt, Southfield, MI (US); Wesley Grant Morris, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 314 days.

(21) Appl. No.: 13/938,488

(22) Filed: Jul. 10, 2013

(65) Prior Publication Data

US 2015/0014610 A1    Jan. 15, 2015

(51) Int. Cl.
*B62D 43/06* (2006.01)
*B62D 43/10* (2006.01)
*B60R 11/06* (2006.01)
*B66F 3/12* (2006.01)
*B60R 11/00* (2006.01)

(52) U.S. Cl.
CPC ............... *B60R 11/06* (2013.01); *B62D 43/06* (2013.01); *B62D 43/10* (2013.01); *B66F 3/12* (2013.01); *B60R 2011/0036* (2013.01); *Y10T 29/49947* (2015.01); *Y10T 29/49963* (2015.01)

(58) Field of Classification Search
CPC .................................. B62D 43/06; B62D 43/10
USPC ............................................. 224/42.14, 42.24
See application file for complete search history.

(56) References Cited

U.S. PATENT DOCUMENTS

| | | | |
|---|---|---|---|
| 1,795,048 A | 3/1931 | Schuh | |
| 2,631,766 A | 3/1953 | Kelley | |
| 4,607,406 A | 8/1986 | Davis | |
| 4,733,583 A | 3/1988 | Lewis | |
| 5,201,257 A | 4/1993 | Engel | |
| 5,429,285 A * | 7/1995 | Kim | B62D 43/10 206/373 |
| 5,586,698 A | 12/1996 | Satoh | |
| 5,699,701 A | 12/1997 | Cotten | |
| 5,823,408 A * | 10/1998 | Kim | B62D 43/10 224/42.21 |
| 6,082,803 A | 7/2000 | Klueger | |
| 6,783,039 B2 | 8/2004 | Zum Mallen | |
| 7,036,860 B1 | 5/2006 | McGuckin | |
| 7,708,175 B2 | 5/2010 | Edwards | |

FOREIGN PATENT DOCUMENTS

| | | | |
|---|---|---|---|
| DE | 29917840 U1 * | 3/2000 | ............ B62D 43/10 |
| EP | 0578547 B1 | 12/1994 | |
| FR | EP 0769446 B1 * | 1/2001 | ............ B62D 43/10 |
| WO | WO 9515880 A1 * | 6/1995 | ............ B60R 11/06 |

* cited by examiner

*Primary Examiner* — Justin Larson
(74) *Attorney, Agent, or Firm* — Raymond L. Coppiellie; Brooks Kushman P.C.

(57) ABSTRACT

A vehicle includes a spare wheel, a jack and a jack wrench. The jack and a jack wrench are provided to raise the vehicle to allow a user to remove a damaged wheel and replace it with the spare wheel. The jack and jack wrench are secured to the vehicle via a first connector. The spare wheel is then secured to the first connector via a second connector. The second connector extends through the spare wheel and into the first connector to secure the spare wheel to the first connector and thus to the vehicle.

17 Claims, 5 Drawing Sheets

SECURING A JACK AND A SPARE WHEEL TO A VEHICLE

TECHNICAL FIELD

The present disclosure is direct to a method and an apparatus used to secure a jack and a spare wheel to a vehicle.

BACKGROUND

It is standard for many vehicles to carry a spare wheel in case one of the driving wheels is damaged or deflated. The vehicle may also carry a jack to raise the vehicle so that the wheel can be replaced. The spare wheel and jack are typically mounted or otherwise secured to the vehicle body. The spare wheel, the jack and any other tools should be effectively secured to the vehicle while being easily accessible.

SUMMARY

In one embodiment, a method of securing a jack and a spare wheel to a vehicle is provided. The jack may be a scissor car jack, a hydraulic jack, or any other jack capable of lifting the vehicle to allow a person to replace an attached wheel with the spare wheel. The method first includes securing the jack to the vehicle via a first connector. The first connector is attachable to a bracket mounted on the vehicle. When secured, the jack is compressed or otherwise held between the first connector and the vehicle. The method then includes securing the spare wheel to the first connector via a second connector. The second connector is received within an aperture or receptacle within the first connector to secure the spare wheel between the first and second connectors.

In another embodiment, a connector assembly secures a jack and a spare wheel to a vehicle. The assembly includes a first connector and a second connector. The first connector extends through the jack and attaches to the vehicle when attaching the jack to the vehicle. The second connector extends through the spare wheel and attaches to the first connector when securing the spare wheel to the vehicle.

In yet another embodiment, a scissor jack for a vehicle is provided. An upper bracket includes a first locking device and is attached to jack upper arms. A lower bracket has a second locking device and is attached to jack lower arms. A screw extends through the jack to adjust the width of the jack and the upper and lower brackets between an extended position, or usage position, and a contracted position, or storage position. A wrench is foldable about a pivot. The first locking device engages the pivot and the second locking device engages the opposite end of the wrench when the scissor jack is adjusted to the contracted position.

DETAILED DESCRIPTION

Embodiments of the present invention are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
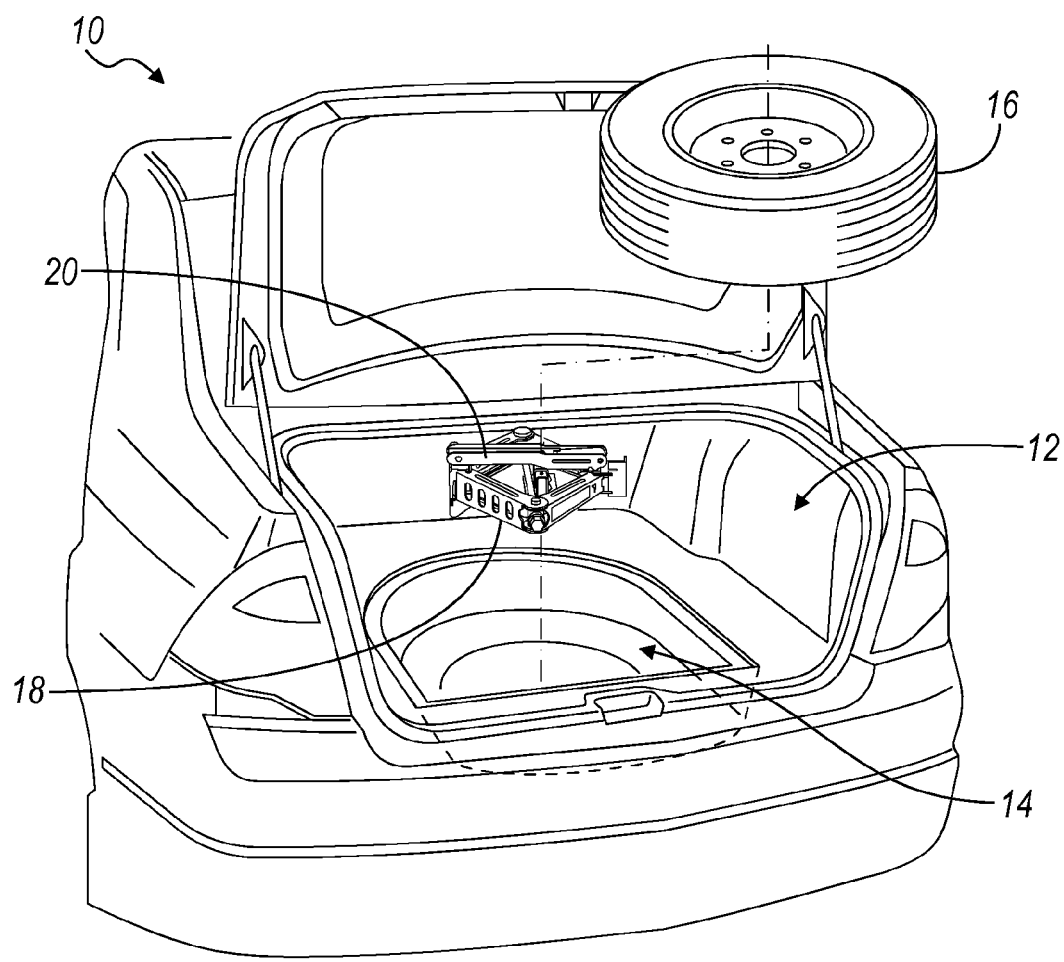
FIG. 1 is a partial prospective view of a vehicle to which a spare wheel, a jack and a jack wrench are secured.

Referring to FIG. 1, a vehicle 10 is includes a storage compartment 12. In the illustrated embodiment the storage compartment 12 is a trunk, however it should be understood that the vehicle 10 can be a hatchback or a wagon in which the storage compartment 12 is open and accessible to a passenger compartment of the vehicle 10.

The storage compartment 12 includes a wheel tub or well 14 or other suitable area to store a spare wheel 16. While the wheel well 14 is shown to be within the storage compartment 12, the wheel well 14 can be on the underside of the vehicle 10 or elsewhere about the vehicle in order to provide an area for secure attachment of the spare wheel 16. In other embodiments the vehicle 10 does not include a wheel well 14 and the spare wheel 16 merely attaches to the vehicle body or within a compartment.

The spare wheel 16 is a conventional spare wheel with bolt holes for attachment to the vehicle. The spare wheel 16 can be a full size spare wheel having a diameter and width generally equivalent to at least one of the wheels and tires normally supporting the vehicle 10. The spare wheel 16 can alternatively be a temporary wheel having a reduced diameter and width compared to the tires normally supporting the vehicle 10. In short, any wheel or spare wheel 16 may be utilized for purposes of the present disclosure.

A jack 18 is provided to lift the vehicle during removal and replacement of wheels on the vehicle 10. The jack 18 is a scissor jack but can be any suitable jack to raise the vehicle 10. A jack wrench, or wrench 20 is connectable to a bolt in the jack 18 such that rotation of the wrench 20 extends the jack 18 to raise the vehicle 10. Additional details of usage of the jack 18 and jack wrench 20 are provided in the description of FIG. 2 below.

The spare wheel 16, jack 18 and wrench 20 are main beneficial components to fixing or replacing tires or wheels of the vehicle 10. These components are typically desired to be stored in an area such as the wheel well 14 that does not sacrifice storage volume in the storage compartment. A compact packaging and storing of these components is therefore desirable. To more efficiently store the components, a connector assembly is provided that mounts the jack 18 and wrench 20 to the vehicle 10 via a first connector and secures the spare wheel 16 to the vehicle 10 via a second connector that is connectable to the first connector. This embodiment and other embodiments are provided below with reference to FIGS. 2-5.

Figure 2:
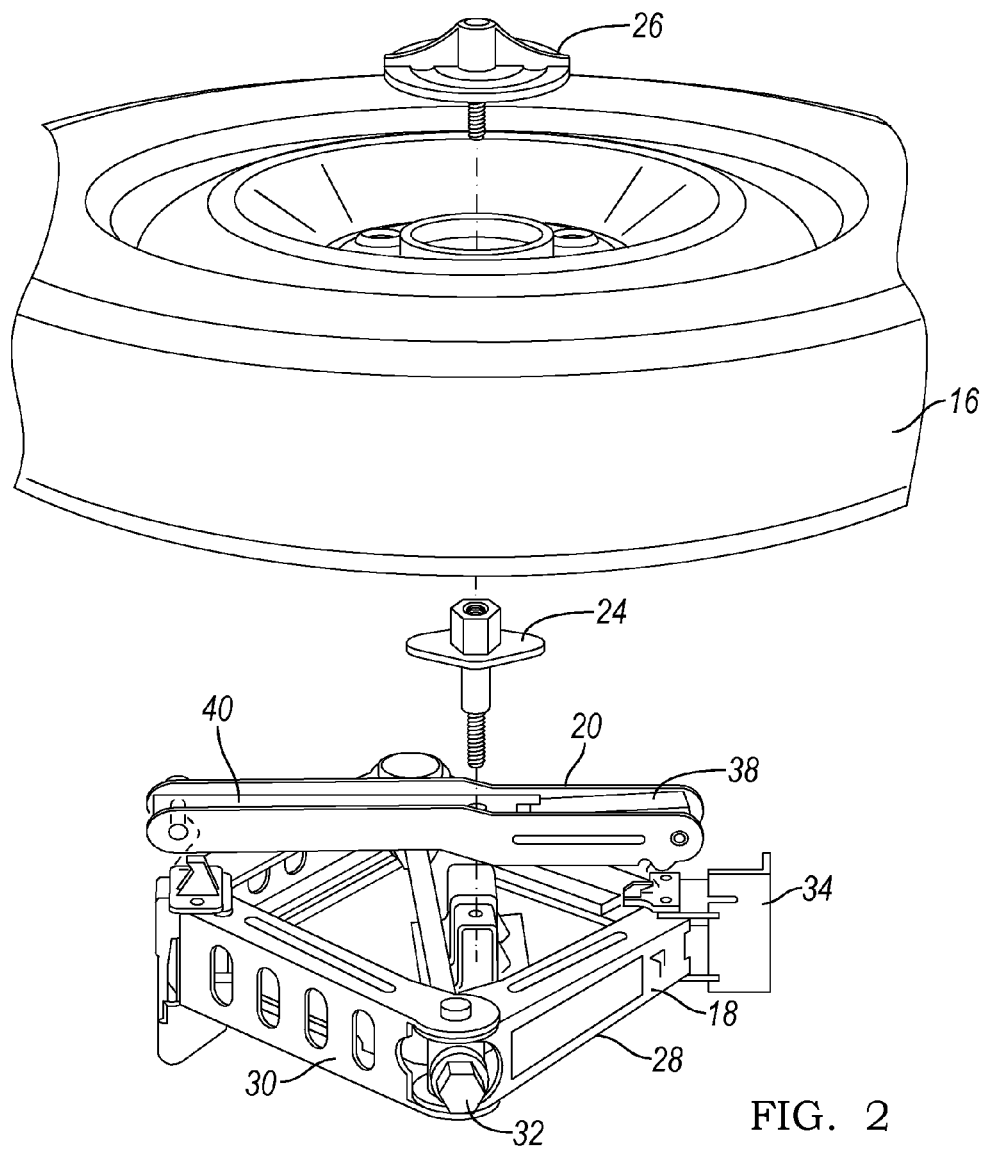
FIG. 2 is an exploded perspective view of a spare wheel, a jack, and a jack wrench detached from a vehicle.
Figure 6:
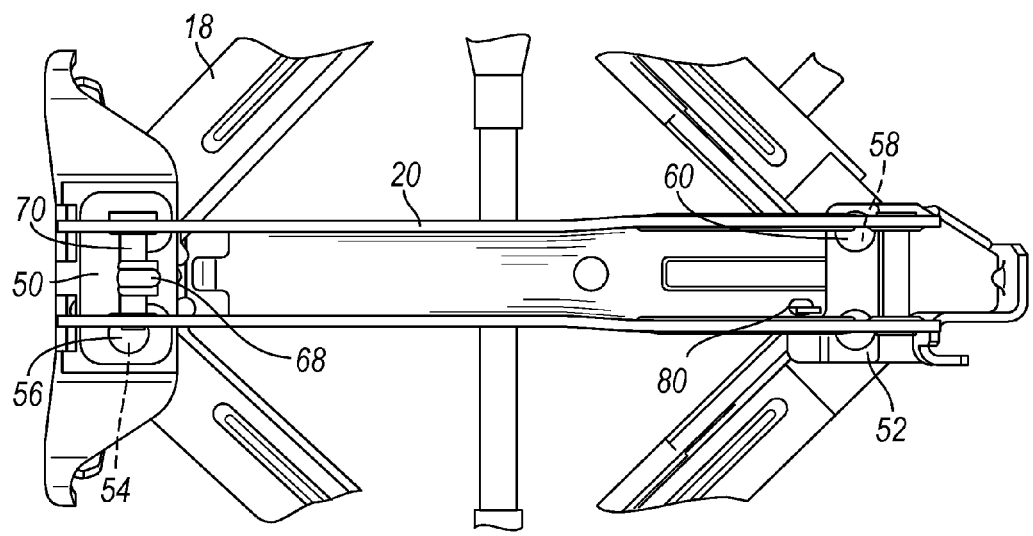
FIG. 6 is a top view of the jack wrench secured to the jack via clips.

Referring to FIG. 2, various tools and parts are shown in an exploded view disassembled from the vehicle 10. To assemble to the vehicle 10, first the jack 18 and wrench 20 can be clipped or otherwise secured to one another, as will be further described with reference to FIGS. 6-7. The jack 18 and wrench 20 are then secured to the vehicle 10 via a first connector 24. The first connector 24 passes through an area in one or both of the jack 18 and wrench 20 and secures to the vehicle 10. The spare wheel 16 is placed above the jack 18 and wrench 20 such that a center opening in the spare wheel 16 aligns with the first connector 24. A second connector 26 secures the spare wheel 16 to the vehicle 10 by screwing or otherwise attaching to an upper portion of the first connector 24. The second connector 26 can include a radially-extending flange and a rib extending from the flange to provide a grip to facilitate the tightening of the second connector 26 to the first connector 24. Preferably, the second connector 26 is coaxial with the first connector 24 when attached.

It should be understood that references to any of the jack 18, wrench 20, or spare wheel 16 being "secured to the vehicle" does not necessarily mean being structurally fixed to a portion of the vehicle 10. For instance, the spare wheel 16 may be secured to the first connector 24 or jack 18 or wrench 20 without actually contacting the vehicle 10 itself, but is still considered secured to the vehicle 10 when the first connector 24 and second connector 26 are connected to one another.

As previously described, one embodiment of the jack 18 is a scissor jack. The jack 18 includes upper V-shaped arms 28 attached to respective lower V-shaped arms 30. A screw or bolt 32 extends through the interior portion of the jack 18. The wrench 20 is used to turn the bolt 32 in either rotational direction, causing the connecting points of the upper and lower arms 28, 30 to move laterally towards or away from one another. An upper bracket 34 is attached to the upper arms 28 for engagement with the vehicle 10 when the bolt 32 is rotated to extend the jack 18.

Figure 3:
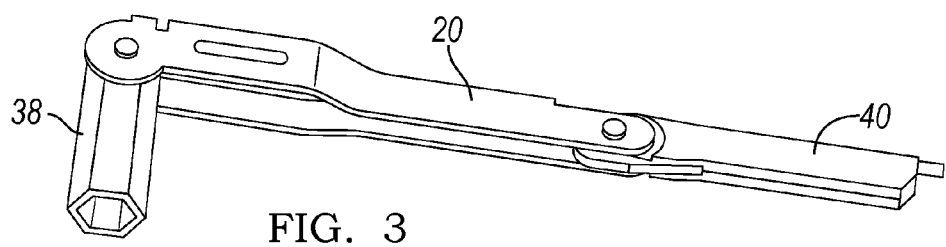
FIG. 3 is a perspective view of the jack wrench with extendable arms extended outward.

Referring to FIG. 3, the jack wrench 20 is further illustrated. The wrench 20 is a trifold wrench having first and second extendable arms 38, 40. The first extendable arm 38 includes a socket wrench head configured to fit over the bolt 32 to extend and retract the jack 18. The second extendable arm folds outward to provide the user with a longer gripping area for better utilization of force to turn the bolt 32. When the wrench 20 is ready to be secured back on the vehicle 10, the extendable arms 38, 40 can fold back inward to reduce the length of the wrench 20 for efficient packaging. The trifold wrench 20 can be utilized with a scissor jack or with other types of jacks in which a user-provided rotational force is necessary.

Figure 4:
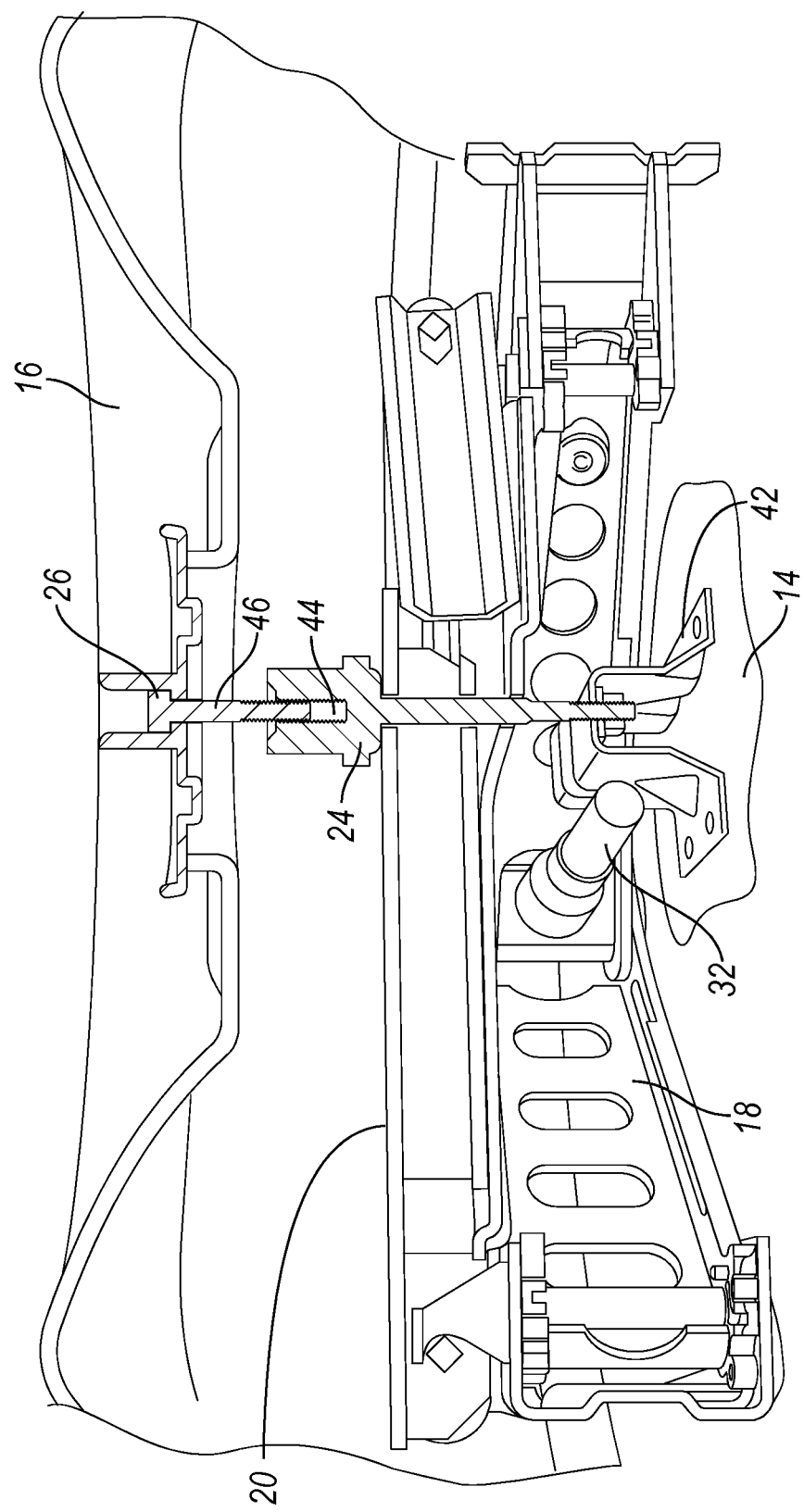
FIG. 4 is a cross-sectional view of a the spare wheel, the jack and the jack wrench secured to the vehicle via connectors that attach to one another.

Referring to FIG. 4, the spare wheel 16 and the accessories are secured to the vehicle 10. A bracket 42 is provided as an attachment point for the first connector 24 to the vehicle 10. The jack 18 rests in the wheel well 14 and the wrench 20 is connected to the jack 18 via clips 50, 52 or other suitable locking devices, as will be described with reference to FIGS. 6-7. A screw portion or a bolt of the first connector 24 fits through an aperture in the wrench 20 and screws into the bracket 42 to secure the jack 18 and wrench 20 to the vehicle 10.

With the jack 18 and wrench 20 secured, the spare wheel 16 is placed in the wheel well 14 over the jack 18 and wrench 20. The second connector 26 fits through an aperture in the outer surface of the spare wheel 16 and screws into a receptacle 44 defined within the upper end of the first connector 24. The second connector 26 includes a bolt portion with outer threads that correspond to inner threads within the receptacle 44. The second connector 26 secures the spare wheel 16 to the first connector 24 and thus the vehicle 10.

As described above, the first connector 24 includes a receptacle 44 to receive the second connector 26. The receptacle 44 can include internal threading to receive corresponding external threading from a screw portion or bolt 46 of the second connector 26. The first and second connectors 24, 26 thus each include a central axis that is colinear when the connectors 24, 26 are secured to one another.

Screw threading is but one example of the first and second connectors 24, 26 connecting together. Clips, rivets, clamps, and the like are also contemplated to effectively secure the spare wheel 16, the jack 18 and the wrench 20 to the connectors and thus to the vehicle 10.

The embodiments illustrated in FIGS. 2-4 are merely examples of configurations in which the spare wheel 16, jack 18, and wrench 20 are secured to the vehicle 10. Other embodiments are contemplated in which the spare wheel 16 can first be secured to the vehicle 10 via the first connector. In those embodiments, the jack 18 and wrench 20 are secured to an area within the rim of the spare wheel 16 via the second connector 26.

Figure 5:
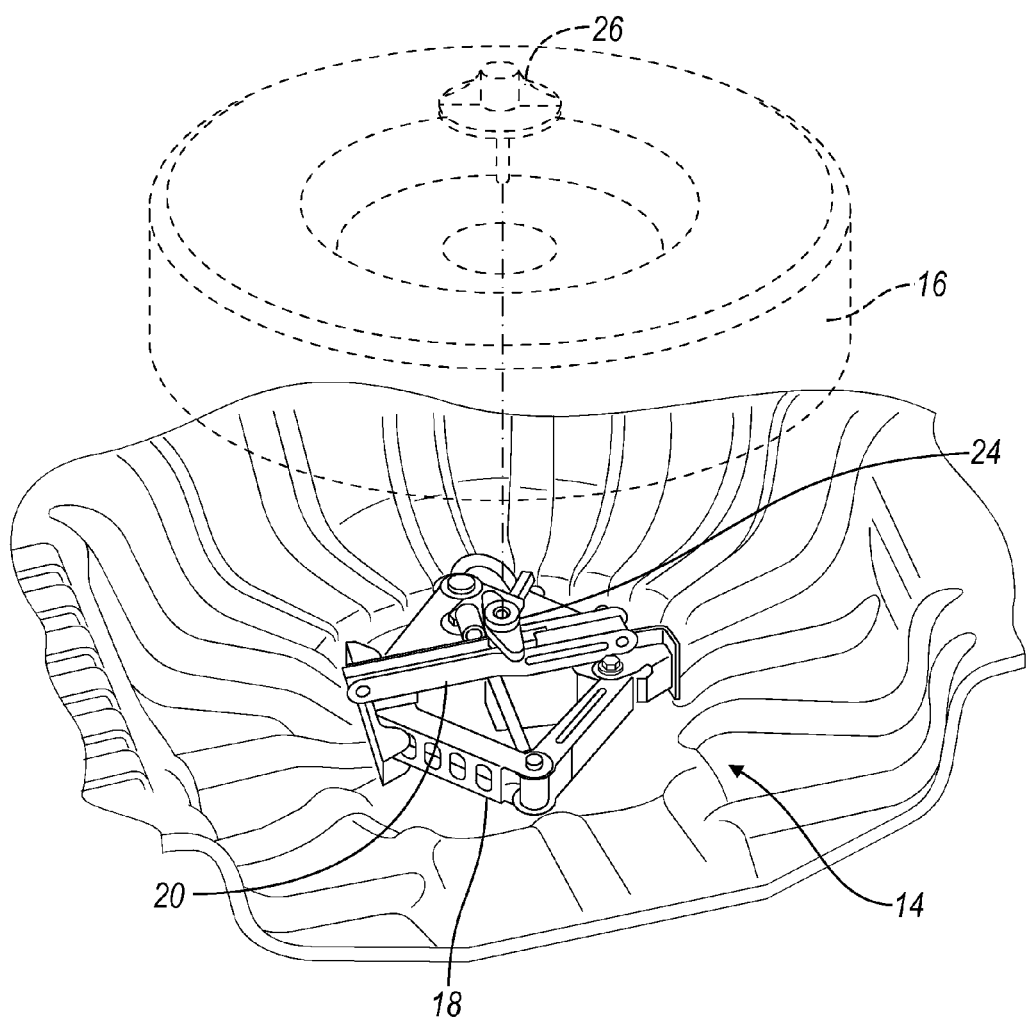
FIG. 5 is a perspective view of the jack and jack wrench secured to the vehicle via a connector without the spare wheel attached.

Referring to FIG. 5, the jack 18 and wrench 20 are shown secured to the wheel well 14 of the vehicle 10 via the first connector 24. The wheel 16 and second connector 26 are shown as being removed from the wheel well 14, but could be replaceable thereafter. Once a user has successfully replaced a damaged wheel on the vehicle 10 with the spare wheel 16, the jack 18 and wrench 20 can be secured to the bracket via the first connector 24. The second connector 26 can be either screwed into the first connector 24 or otherwise stored in the vehicle 10 during travel. Alternatively, the second connector 26 can secure the damaged wheel to the vehicle 10 in place of the spare wheel 16.

Referring to FIGS. 6 and 7A-7C, the wrench 20 is secured to the jack 18 by a pair of opposing locking devices, or clips 50, 52. Clip 50 includes a pair of holes or openings 54 to receive respective bolts 56 (or similar attachment mechanisms) that mount clip 50 to a lower portion of the jack 18. Similarly, clip 52 includes a pair of holes or openings 58 to receive respective bolts 60 (or similar attachment mechanisms) that mount clip 52 to an opposing upper portion of the jack 18. Clip 52 may also be bolted to the upper bracket 34 and to the jack 18, as shown in FIG. 2. Other configurations are also contemplated regarding the relationship of the clips 50, 52 to the jack 18; for example, clips 50, 52 may be molded or welded to the jack 18, eliminating the need for the bolts 56, 60 and corresponding openings 54, 58.

Figure 7A:
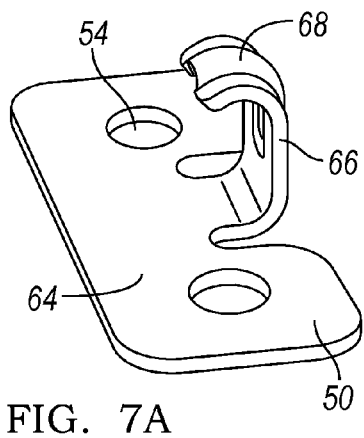
FIGS. 7A-7C are perspective views of various clips to secure the jack wrench to the jack.

Clip 50 is shown in isolation in FIG. 7A. Clip 50 includes a generally planar base surface 64 and a transversely-extending member 66. A hook 68 is provided at the end of the transversely-extending member 66. The hook 68 mates with a pivot member 70 of the wrench 20. The hook 68 includes a radius of curvature similar to that of the pivot member 70 of the wrench 20 and is flexible relative to the base surface 64. This enables the user to secure one end of the wrench 20 to the jack 18 by nesting the pivot member 70 of the wrench 20 within the hook 68.

Figure 7B:
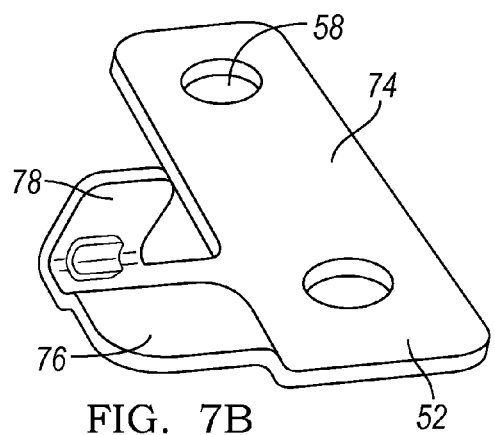

Clip 52 is shown in isolation in FIG. 7B. Clip 52 includes a generally planar base surface 74 and a coplanar member 76 extending from the base surface 74. A projection or flange 78 extends angularly with respect to the plane of the coplanar member 76, and the flange 78 extends opposite to the extending direction of the hook 68. The flange 78 is sized to fit within a hole 80 in the wrench 20.

To attach the wrench 20 to the jack 18, the user can slide the hole 80 of the wrench about the flange 78 to temporarily secure one end of the wrench 20 to the jack 18. The user can then slide the pivot member 70 into the hook 68 to secure another end of the wrench 20 to the jack 18. The combination of both clips 50, 52 fixedly secures the wrench 20 to the jack 18 before the spare wheel 16 is placed over the now-secured jack and wrench combination.

Clips 50, 52 are located at opposing ends of the jack 18. In order to secure the wrench 20 to the jack 18, it may be necessary to either compress or extend the jack 18 such that the relative distance between the opposing clips 50, 52 corresponds to the opposing ends of the wrench 20. In other words, it may be necessary for the user to either compress or extend the jack 18 to a correct size before the user is able to position the pivot member 70 within the hook 68 and the flange 78 within the hole 80 to secure the wrench 20 to the jack 18. This maintains a desirable compression of the jack 18 while the jack 18 and attached wrench 20 remain in storage in the vehicle. It should be understood that the relative sizing and positioning of the wrench 20, the jack 18, and the clips 50, 52 can be adjusted such that various desirable compression amounts are established in the jack 18 when the jack 18 is secured with the wrench 20.

Figure 7C:
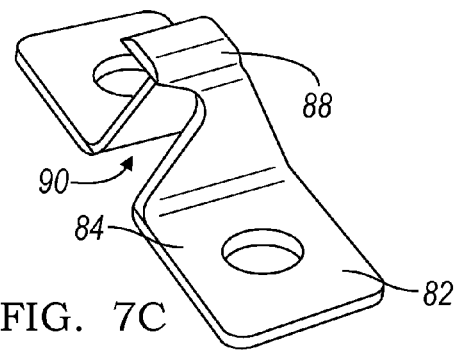

Clips 50, 52 are only two examples of various clips that can be utilized to secure the wrench 20 to the jack 18. Other various embodiments of the clips are contemplated. For example, another clip 82 is illustrated in FIG. 7C. Clip 82 includes a generally planar base surface 84 for welding, bolting, or otherwise attaching to the jack 18. A hook 88 extends angularly from the base surface 84. The hook 88 extends over an opening 90 formed along the width of the base surface 84. The opening 90 enables extraneous members or parts of either the jack 18 or the wrench 20 to extend therethrough while the clip 82 maintains the wrench 20 in a secured relationship with the jack 18. In some other cases, clips 50, 52 could be integrated into the upper and lower brackets separately, and hooks 68, 88 could be a curved piece extending or cutting from the upper and lower brackets.

Each of the exemplary clips 50, 52, 82 clips have features that promote compressive retention to retain the wrench 20 on the jack 18. For example, the hooks 68, 88 and the flange 78 can combine to compress or retain the wrench 20 toward the jack 18. This minimizes noises and vibrations between the wrench 20 and the jack 18 during without requiring additional mounting accessories (such as bolts, etc.) that would increase the amount of time the user takes to remove and reattach the wrench 20 and jack from one another during a tire change.

While the present disclosure includes securing various items (e.g., a jack, jack wrench, and spare wheel) to a passenger vehicle, it is contemplated that the items can be secured to any moveable structure or vehicle in which a spare tire may be needed. For example, trailers, recreational vehicles (RVs), all-terrain vehicle (ATVs), and many others are contemplated examples of structures and vehicles on which the items may be secured to and are contemplated to be within the scope of the present invention.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An assembly for securing a jack and a spare wheel to a vehicle, the assembly comprising:
   a first connector extending through the jack and attached to the vehicle to secure the jack to the vehicle, the first connector having a head with a receptacle; and
   a second connector extending at least partially through the spare wheel and attached to the first connector within the receptacle to secure the spare wheel to the vehicle.

2. The assembly of claim 1, wherein the first connector is a bolt.

3. The assembly of claim 1, wherein the first connector includes a receptacle that receives to receive the second connector.

4. The assembly of claim 3, wherein an interior surface of the receptacle of the first connector includes an inner screw thread, and wherein the second connector includes an outer screw thread for securing with the inner screw thread.

5. The assembly of claim 1, wherein the second connector includes a handle located at an end of the second connector for facilitating rotation the second connector relative to the first connector to secure the spare wheel to the vehicle.

6. The assembly of claim 5, wherein the handle includes a radially-extending flange and a rib extending from the flange.

7. The assembly of claim 5, wherein the handle includes a radially-extending flange that engages the spare tire, and a rib extending from the flange.

8. The assembly of claim 1, further comprising a jack wrench, wherein the first connector further extends through the jack wrench and at least partially into the vehicle.

9. The assembly of claim 8, wherein the first connector compresses the jack between the jack wrench and the vehicle.

10. The assembly of claim 8, wherein the jack includes a locking device extending therefrom to selectively secure the jack wrench to the jack.

11. The assembly of claim 10, wherein the jack wrench is foldable about a pivot, and wherein the locking device includes a hook configured to engage the pivot to secure the jack wrench to the jack.

12. An assembly in a vehicle, comprising:
    a jack;
    a first connector extending through the jack and securing the jack to the vehicle, the first connector having an internally-threaded receptacle;
    a spare tire covering the jack; and
    a second connector engaging the spare tire, extending completely through the spare tire, and having a threaded portion engaging the internally-threaded receptacle to secure the spare tire and the jack to the vehicle.

13. The assembly of claim 12, wherein the second connector includes a handle located at an end of the second connector for facilitating rotation the second connector relative to the first connector to secure the spare wheel to the vehicle.

14. The assembly of claim 12, further comprising a jack wrench, wherein the first connector further extends through the jack wrench and at least partially into the vehicle.

15. The assembly of claim 14, wherein the first connector compresses the jack between the jack wrench and the vehicle.

16. The assembly of claim 14, wherein the jack includes a clip extending therefrom to selectively receive the jack wrench to secure the jack wrench to the jack.

17. The assembly of claim 16, wherein the jack wrench is foldable about a pivot pin, and wherein the clip includes a hook configured to receive the pivot pin to secure the jack wrench to the jack.

* * * * *